United States Patent
Tsai

(10) Patent No.: US 6,810,560 B1
(45) Date of Patent: Nov. 2, 2004

(54) CASTOR

(76) Inventor: Hai-Ming Tsai, P.O. Box 6-9, Tainan (TW)

( * ) Notice: Subject to any disclaimer, the term of this patent is extended or adjusted under 35 U.S.C. 154(b) by 0 days.

(21) Appl. No.: 10/703,996

(22) Filed: Nov. 6, 2003

(51) Int. Cl.[7] .............................................. B60B 33/00
(52) U.S. Cl. .......................... 16/35 R; 16/20; 188/1.12
(58) Field of Search ....................... 16/35 R, 20, 18 R; 188/1.12

(56) References Cited

U.S. PATENT DOCUMENTS

| | | | | |
|---|---|---|---|---|
| 2,709,828 A | * | 6/1955 | Noelting et al. | 16/35 R |
| 3,571,842 A | * | 3/1971 | Fricke | 16/35 R |
| 3,772,733 A | * | 11/1973 | Stosberg et al. | 16/35 R |
| 3,890,669 A | * | 6/1975 | Reinhards | 16/35 R |
| 4,035,864 A | * | 7/1977 | Schroder | 16/35 R |
| 4,349,937 A | * | 9/1982 | Fontana | 16/35 R |

* cited by examiner

*Primary Examiner*—Suzanne Dino Barrett
*Assistant Examiner*—Mark Williams

(57) ABSTRACT

A castor includes a castor-supporting member, a brake unit, a direction gear, a castor unit, and a threaded rod unit and an orienting system. The brake unit is combined with the castor support member by means of the threaded rod unit, involving an upper brake button placed on a lower brake unit. When the upper brake unit is pressed down, a brake plate of the brake unit is pressed down on the surface of the castor body to stop it. When the upper brake button is further pressed down a little, the brake plate is released to move up, with the brake taken off the castor body. And a disc gear formed in the front portion of the brake plate and engaging the direction gear becomes disengaged from the direction gear. When the brake plate is pressed down to stop the castor body, the disc gear is moved up to engage the direction gear, keeping the castor body immovable in its direction. The orienting system consists of position plate, a pedal and a release plate. When the pedal plate is pressed down, the position plate engages with the direction gear to stop it and then the castor body is also secured in rolling direction, If the release plate is pressed down, the secured direction of the castor body is freed.

5 Claims, 8 Drawing Sheets

CASTOR

BACKGROUND OF THE INVENTION

1. Field of the Invention

This invention relates to for a castor, particularly to one possible to stop a castor and to prevent the castor from changing its direction at the same time by a simple pressing action on a brake button.

2. Description of the Prior Arts

A common conventional castor generally has a brake for stopping, and FIG. 1 shows a kind of known conventional castor, which includes a wheel support member 10, an axle 11, a castor 12, a pivot shaft 13, a brake plate 14 combined with the pivot shaft 13, and a press plate 15.

To put the brake on the conventional castor, the press plate 15 is pressed down to force the brake plate 14 to move down to press on the surface of the castor 12. And in releasing the brake off the castor 12, a user has to bend the body to pull up the press plate 15 so as to let the brake plate not pressing down on the castor 12, very troublesome to do. Moreover, the gap between the wheel support member and the castor 12 is too large so very slender matters such as hairs or strings, may be wound around the axle in the gap to obstacle smooth movement of the castor.

SUMMARY OF THE INVENTION

This invention has been devised to offer a brake for a castor, which is easily handled to put on the brake to the castor body and take the brake off the castor body.

The main feature of the invention is a brake unit, which consists of a brake plate, an upper brake button and a lower brake button. The brake plate is oblong, having a disc gear formed in a front portion, a projection formed on a rear portion located a little above a castor body, and two projections formed at two sides of an intermediate portion. Then the disc gear has a center hole for a threaded rod to pass through upward to be kept a little below a direction gear fixed also on the threaded rod. The lower brake button is shaped as an inverted T, having a small diameter portion and a lower large diameter portion and a center through hole for a coil spring to extend therein, The lower portion has a plurality of vertical projecting ridges spaced apart on an outer surface, and a plurality of vertical grooves interposed alternately with the projecting ridges. The lower portion has its annular upper surface is provided with a plurality of sloped surfaces to match with sloped surfaces of the upper brake button when the upper brake button is combined on the upper portion of the lower brake button. Then when the upper brake button is pressed down, the lower brake button is also moved down and rotated at the same time, with the projecting ridges also rotating from vertical grooves in a cylindrical hole where the upper brake button is located movably to hook with vertical ridges in the cylindrical hole. Then the lower brake button is in a pressed condition, pressing on the surface of the castor body, which is then stopped immovable. Thus the brake is put on the castor body. At the same time the heavier gear of the brake plate usually located a little below the direction gear will be moved up by the two projections functioning as pivots when the rear portion of the brake plate is pressed down by the lower brake button in case of the upper brake button is pressed down to put the brake on the castor body. Thus the gear of the brake plate may engage with the direction gear so that the castor body is prevented from changing its direction. In case of the brake taken off, the gear of the brake plate will move down owing to its own heavier weight than that of the rear portion of the brake plate, disengaging from the direction gear to let the castor body free to change its direction.

Further, a second feature of the invention is an orienting system for securing the direction of the castor in case of not putting the brake on the castor. The orienting system consists of a position plate, a pedal and a release plate, and is combined with the rear end of the castor-supporting member. Then the pedal is pressed down, and the position plate stops the direction gear so that the castor body is stopped, too, with the brake not put on.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
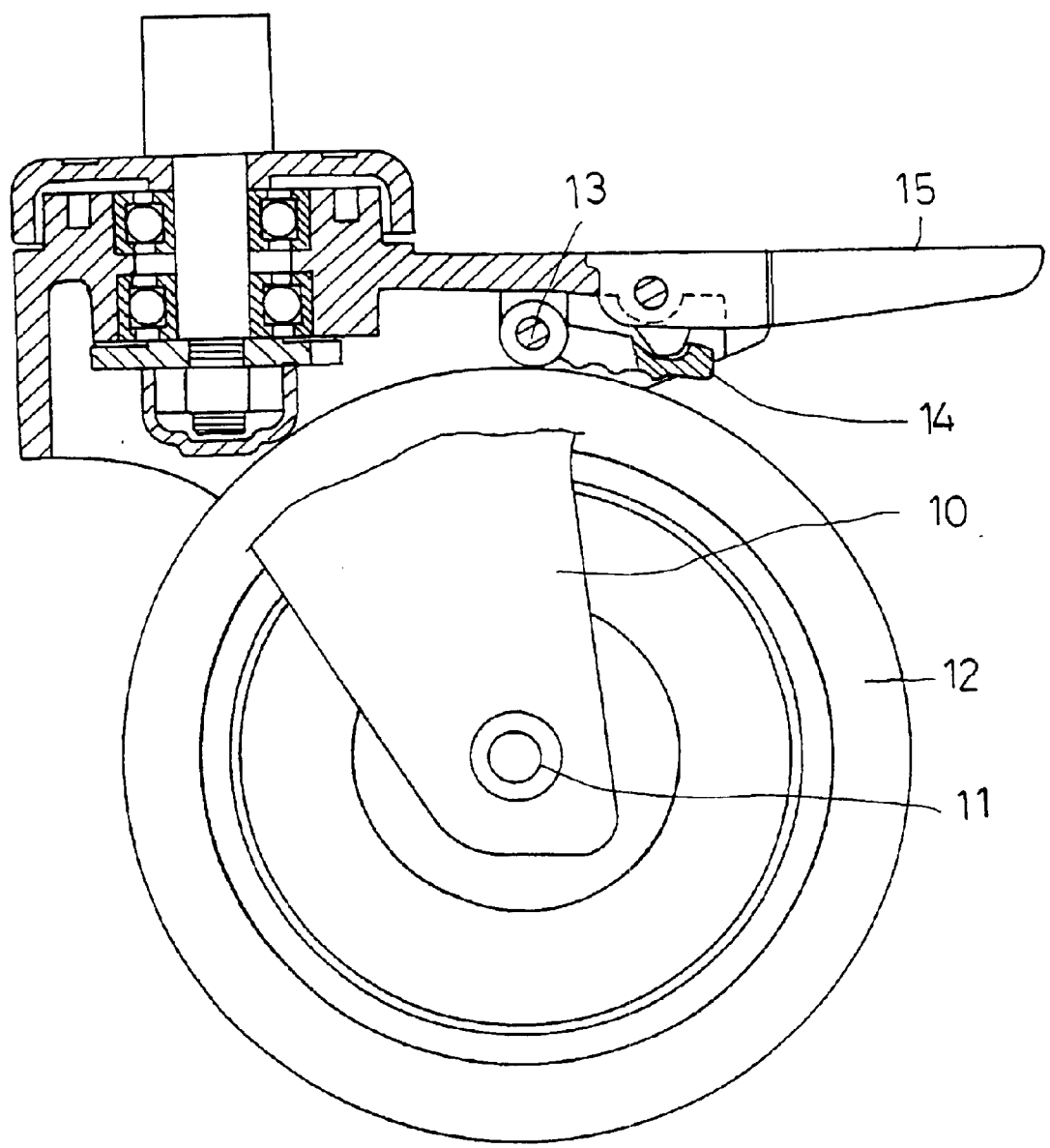
FIG. 1 is a cross-sectional view of a known conventional castor being operated in a way.
Figure 2:
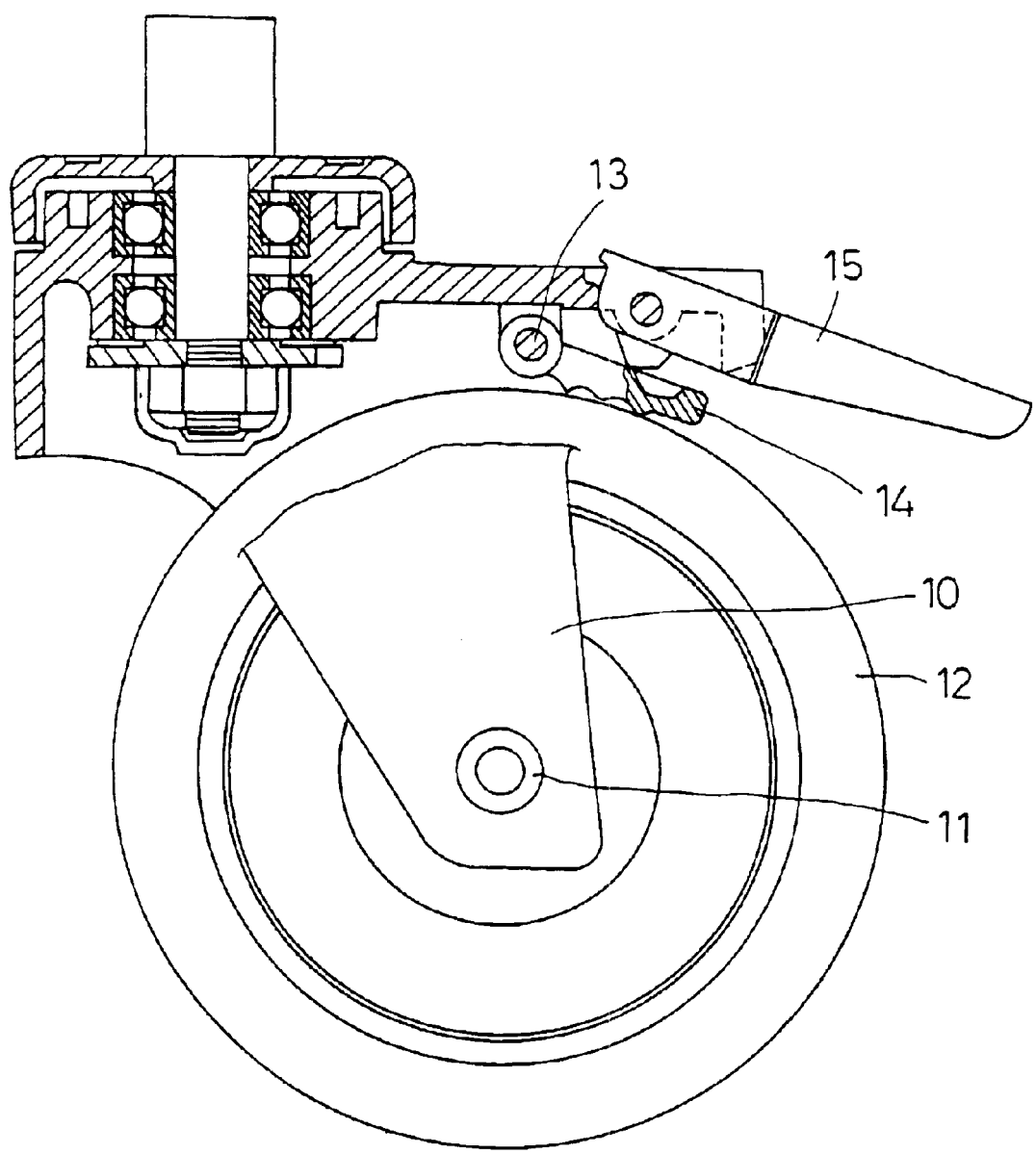
FIG. 2 is a cross-sectional view of the known conventional castor being operated in another way.
Figure 3:
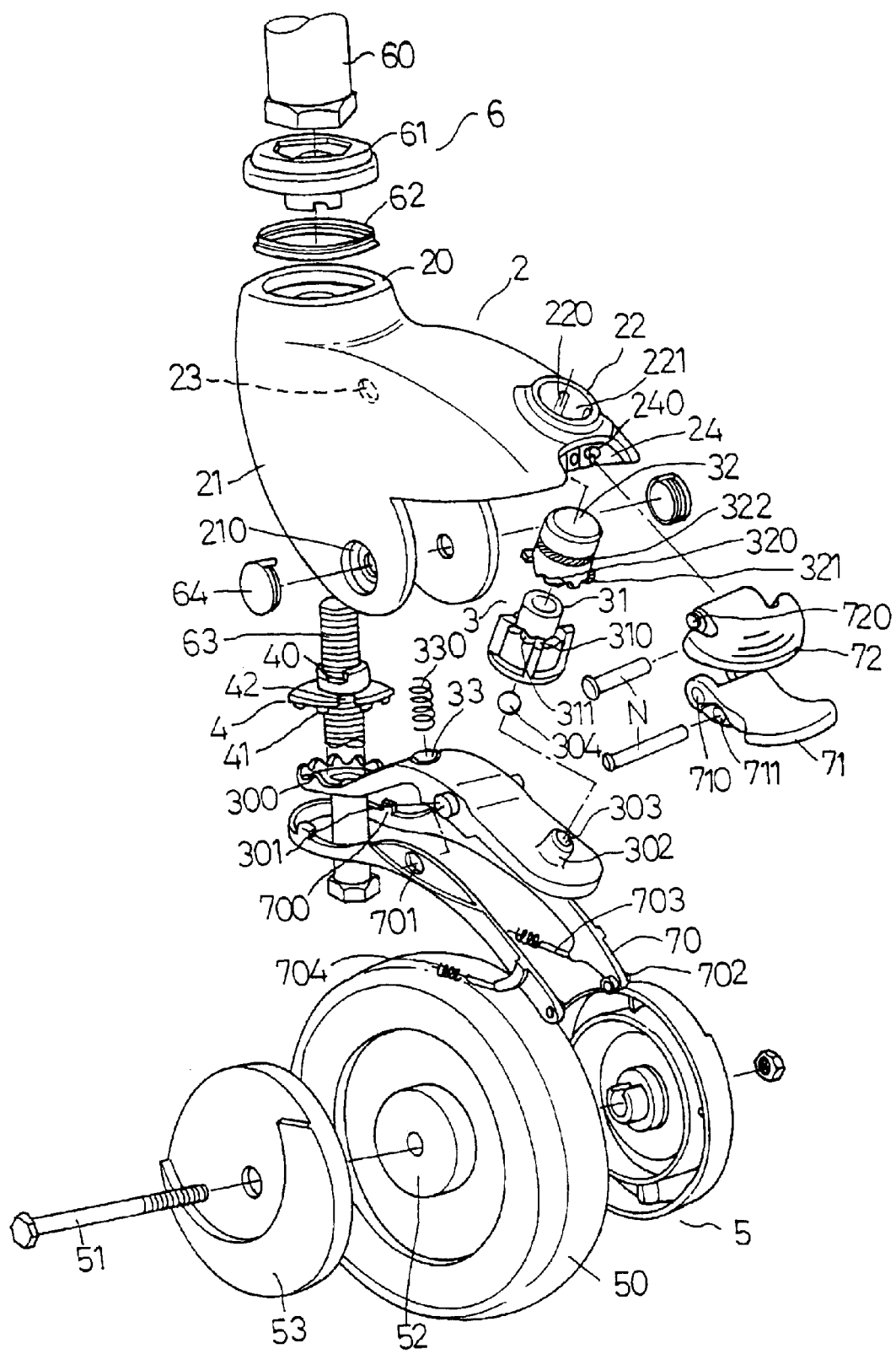
FIG. 3 is an exploded perspective view of a castor in the present invention.
Figure 4:
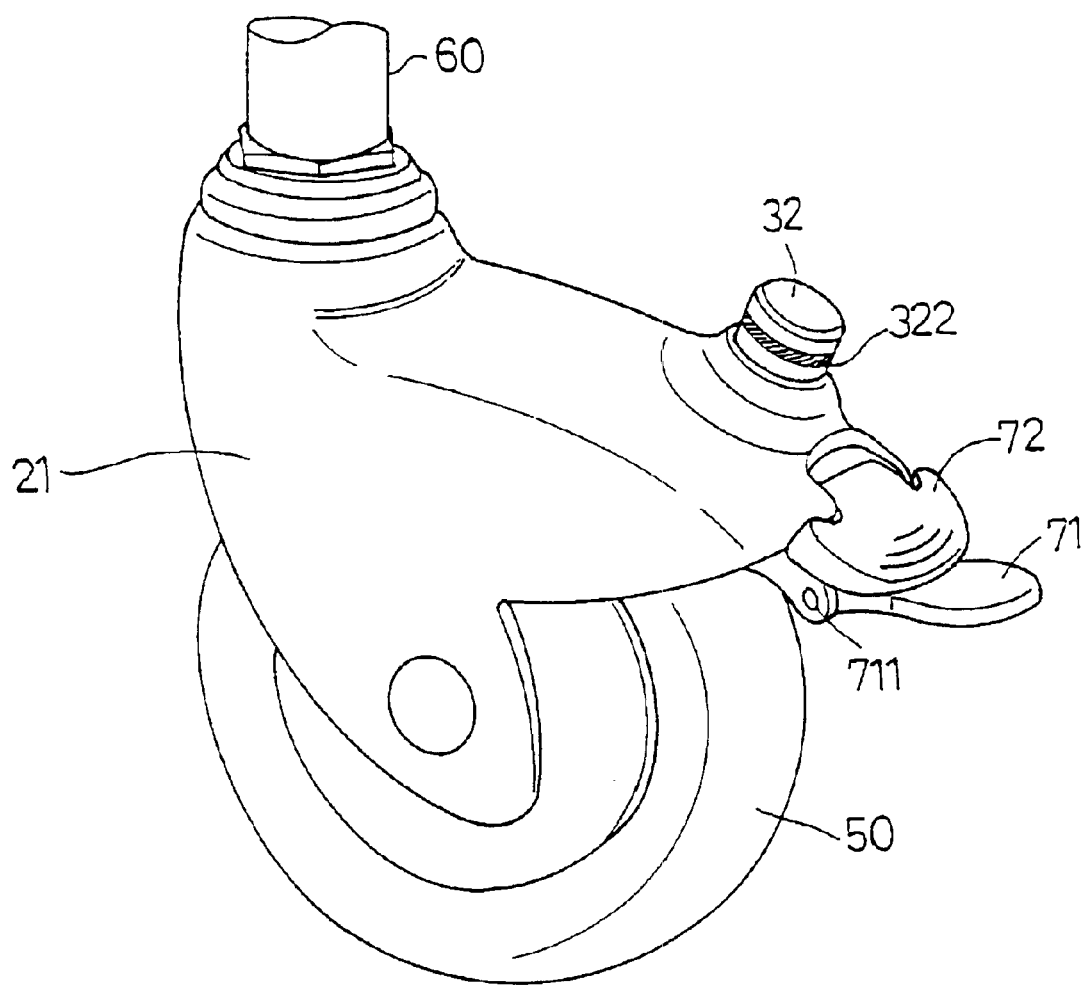
FIG. 4 is a perspective view of the castor in the present invention.
Figure 5:
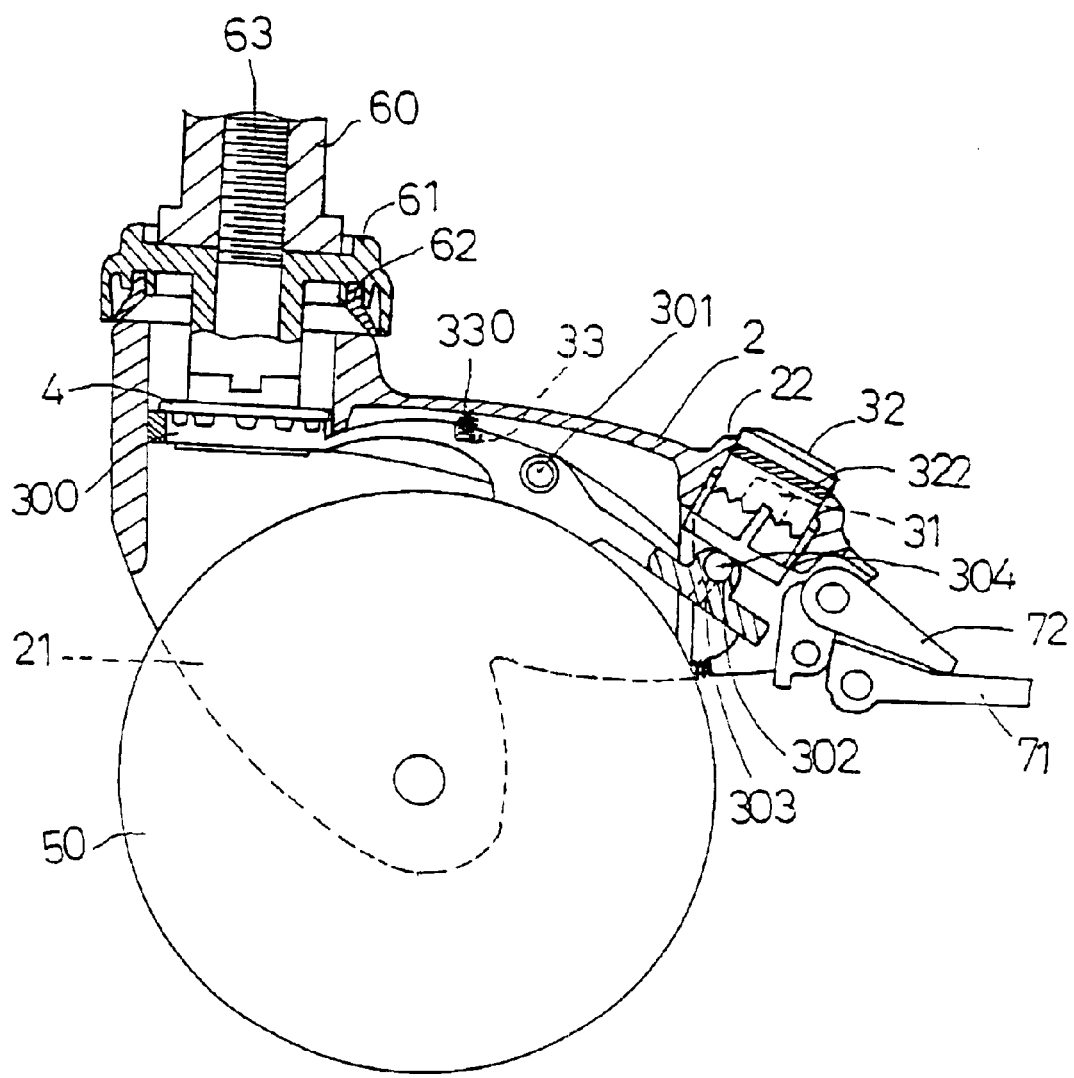
FIG. 5 is a side cross-sectional view of the castor being in a first condition of using in the present invention.
Figure 6:
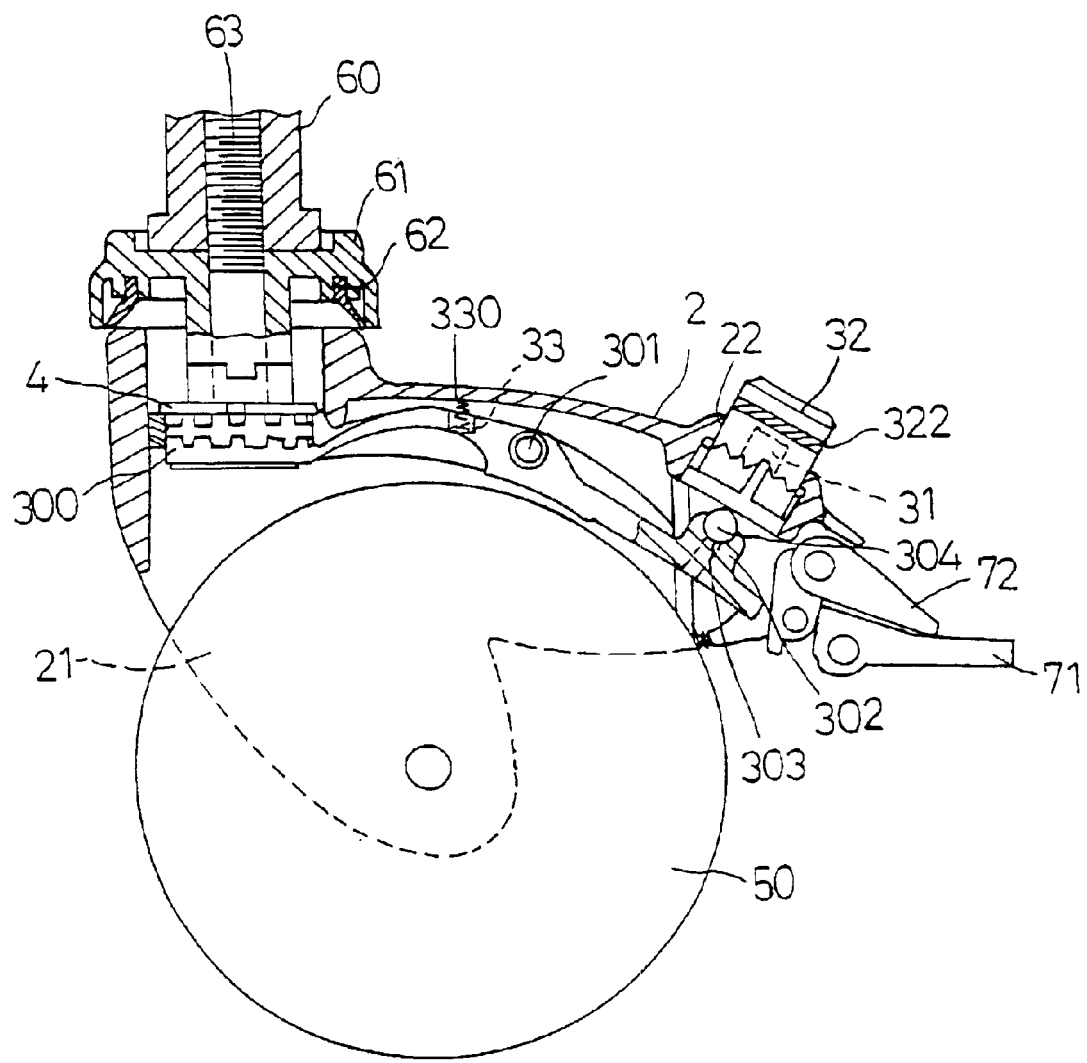
FIG. 6 is a side cross-sectional view of the castor being in a second condition of using in the present invention.
Figure 7:
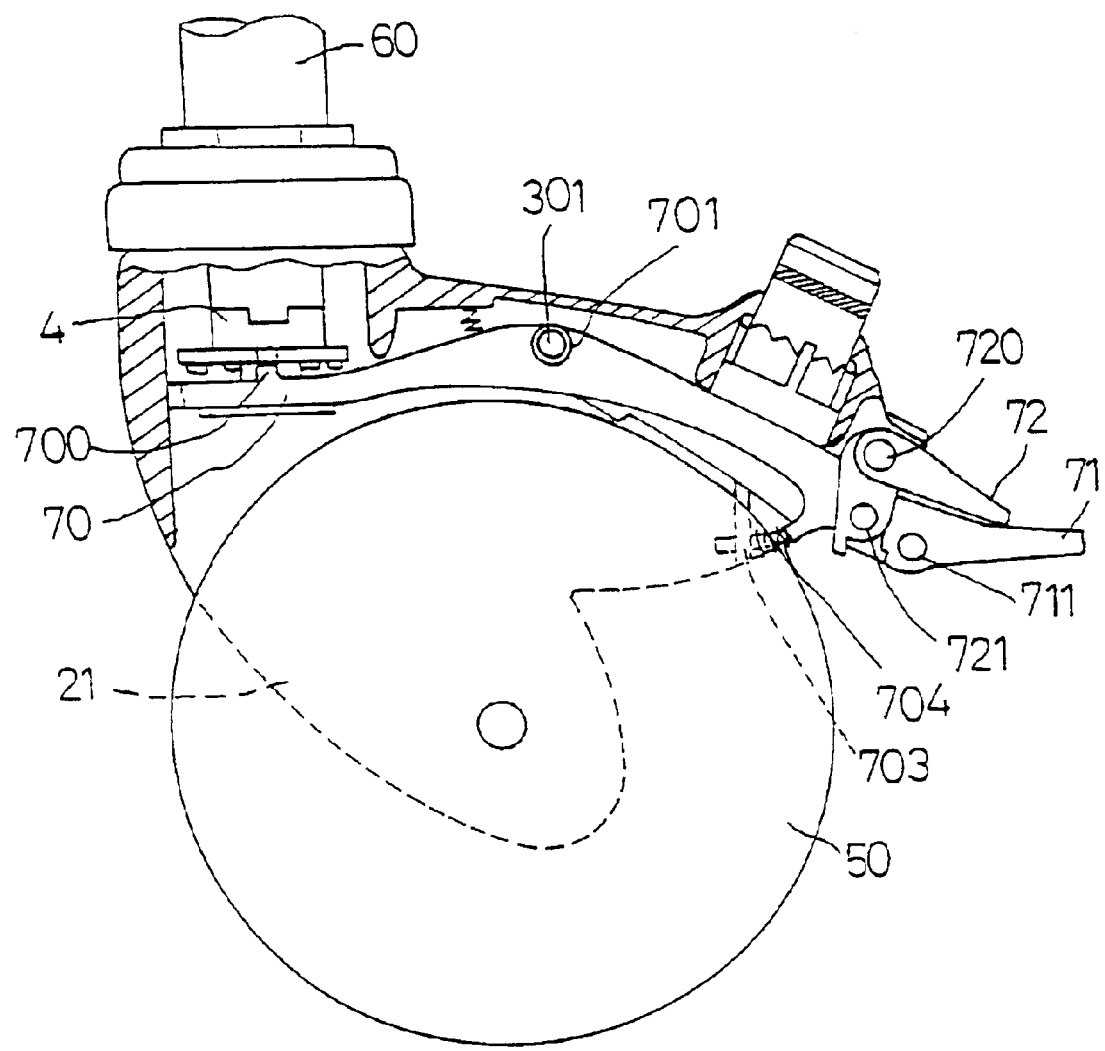
FIG. 7 is a side cross-sectional view of the castor being in a third position of using in the present invention; and, FIG. 8 is a side cross-sectional view of the castor being in a fourth condition of using in the present invention.
Figure 8:
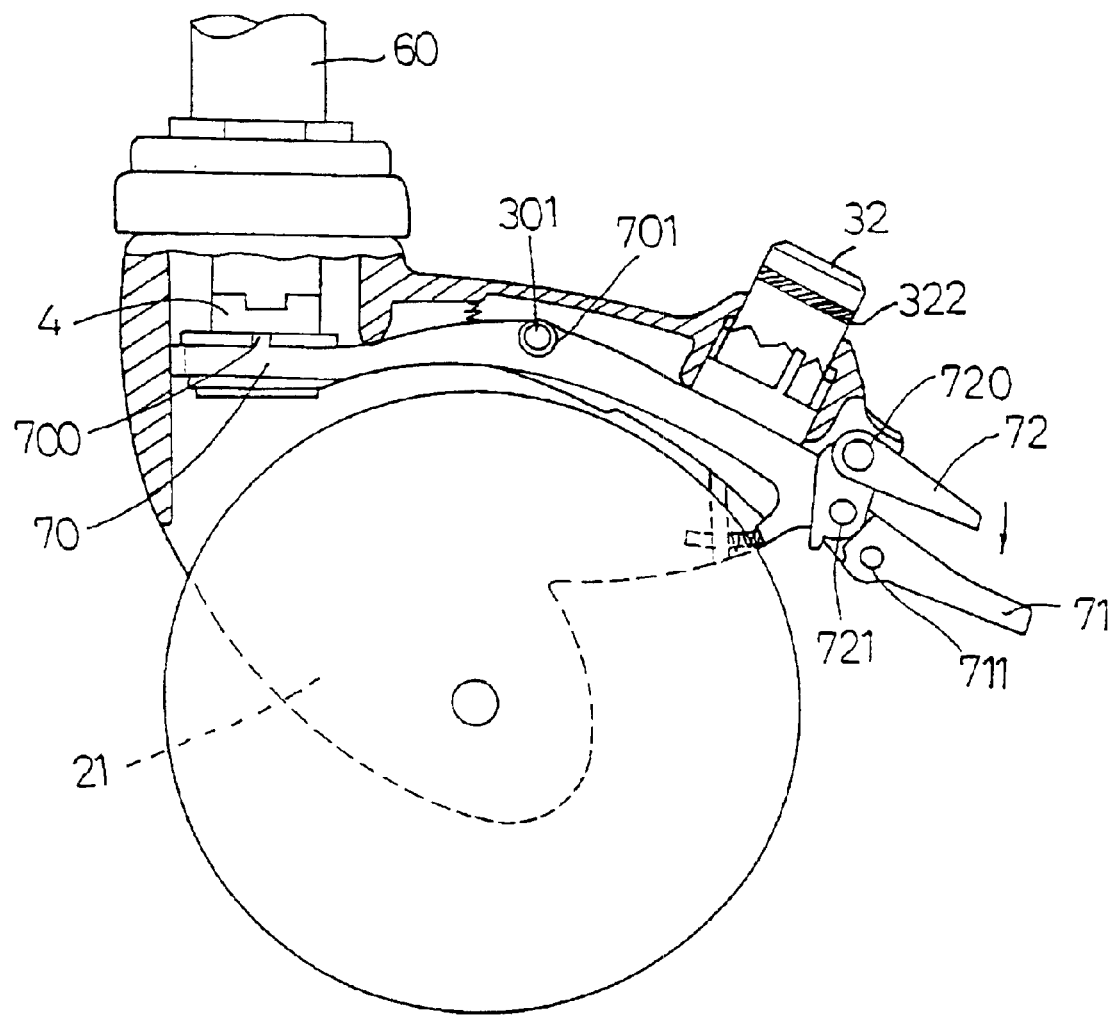

A preferred embodiment of a castor in the present invention, as shown in FIGS. 3–8, includes a castor-supporting member 2, a brake unit 3, a direction gear 4, a castor unit 5, a threaded rod unit 6 and an orienting system 7 as main components.

The castor-supporting member 2 has a shaft hole 20 formed in a front upper portion, a pivot base portion 21 formed in a lower portion of the shaft hole 20, a pivot hole 210 respectively in the lower portions of two parallel walls of the pivot base portion 21, a cylindrical hole 22 formed in a rear upper portion, a plurality of projecting ridges 220 and a plurality of vertical grooves 221 formed alternately and spaced apart in an inner wall of the cylindrical hole 22, and two insert recesses 23 formed in an inner surface of the two parallel walls. Further, the castor supporting member 2 has a recess 24 formed in the rear end behind cylindrical hole 22, and a fitting hole 240 respectively bored in two sides of the recess 24.

The brake unit 3 is positioned in the inner hollow defined by the two parallel walls of the castor support member, having a brake plate 30, a lower brake button 31 and an upper brake button 32.

The brake plate 30 is oblong, having a disc gear 300 formed integral in the front portion, two projections 301 at two sides of the intermediate portion and aligned, a projection 302 with a center round recess 303 formed on the surface of the rear portion with a steel ball 304 fitted in the round recess 303. The lower brake button 31 is nearly shaped as a inverted T, having an upper small diameter portion and a lower large diameter portion, placed on the projection 302, and having a plurality of projecting ridges 310 spaced apart on the outer circumferential surface of the lower portion and a plurality of sloped surfaces 311 spaced apart on an upper annular surface of the lower portion. The upper brake button 32 has a center hollow with a closed upper surface to fit around and sit on the upper portion of the lower brake button 31, plural sloped surfaces formed on an lower annular end surface 320 to match with the sloped surfaces 311 of the lower brake button 31, two opposite projections 321 at two lower opposite sides, and an annular colored line 322 on the intermediate portion of the outer surface. The brake plate 30 further has an annular recess 33 in the intermediate portion for the lower end of a coil spring 330 to sit therein upright.

The direction gear 4 is positioned a little above the disc gear 300 of the brake plate 30 fixed around a threaded rod 63 of the threaded rod units 6 protruding through the center of both the disc gear 300 and the direction gear 4, with the disc gear 300 movable up and down the threaded rod 63. The direction gear 4 has an engage groove 40 in an upper annular edge, an protruding-down engage blocks 41 formed to protrude down in spaced-apart condition from a lower annular edge and an engage groove 42 in the lower annular edge.

The castor unit 5 is combined with the castor-supporting member 2, having a castor body 50, an axle 51, a sealing member 52 and a protective cap 53 combined together, with the axle 51 extending through the pivot holes 210 of the castor-supporting member 2, the center of the protective cap 53, of sealing member 52 and of the castor body 50.

The threaded rod unit 6 has a female-threaded tube 60, a connect head 61, an oil seal 62 and the threaded rod 63. The oil seal 62 is placed on the shaft hole 20, and the connect head 61 is placed on the oil seal 62, with the threaded rod 63 protruding upward out of the shaft hole 20 to screw with the female threads of the threaded tube 60 after inserting from under through the hollow interior of the castor-supporting member 2 and further protruding out of the shaft hole 20. Then the disc gear 300 of the brake plate 30 is combined with the threaded rod 63 and then indirectly with the castor-supporting member 2.

The orienting system 7 is positioned in a lower portion of the hollow interior of the castor-supporting member 2, consisting of a position plate 70, a pedal 71, and a release plate 72, The position plate 70 has a hook member 700 on a front curved surface, a pivotal hole 701 respectively at two sides of the center, a pivotal hole 702 at a rear end, a position post 703 together with a spring 704 inserted in the pivotal hole 70. The pedal 71 is pivotally connected with a pivot N screwing in the pivot hole 702. The complementary plate 72 is pivotally connected on the pedal 71 by means of a pivot N fitting in a pivotal post 720 formed in a front end of the release plate 72, with a position hole 721 also provided in the front end.

In assembling, firstly, the threaded rod 63 is inserted from under through the center hole of the disc gear 300 and then of the direction gear 4. Next, the lower brake button 31 is placed on the projection 302 of the brake plate 30, and then the upper brake button 32 is placed around the upper portion of the lower brake button 31. Then the pivot hole 701 of the orienting plate 70 is fitted around the projections 301 of the brake plate 30, with the position post 703 together with the spring 704 fitting in the fitting hole 23 of the castor-supporting member 2, with the pedal 71 and the release plate 72 combined together by the pivots N, and with pivotal posts 720 of the release plate 72 fitting with the fitting holes 240. Then the threaded rod 63 is inserted upward through the inner hollow of the castor-supporting member 2 and through the shaft hole 20, the oil seal 62 the connect head 61 and then screwing with the threaded tube 60 firmly. Meanwhile, the upper brake button 32 extends upward through the cylindrical hole 22, half hidden therein with the projections 321 engaging with the inner surface of the cylindrical hole 22. At the same time, the projecting ridges 310 of the lower brake button 31 fit in the vertical grooves 221 of the cylindrical hole 22, with the sidewise projections 301 of the brake plate 30 fitting in the insert recesses 23 of the castor-supporting member 2 to function as pivots, letting the front portion including the disc gear 300 heavier than the rear portion of the brake plate 30 to sink down with the rear potion of the brake plate 30 seesawed up to contact and push up the lower brake button 31, keeping the lower brake button 31 and the upper brake button 32 up in the normal unused condition. The coil spring 330 sitting in the recess 33 of the brake plate 30 is compressed under the inner surface of the upper wall of the castor-supporting member 2. Finally the castor unit 65 is assembled together, with the axle 51 combining the castor unit 65 with the pivot holes 210 of the castor-support member 2, finishing assembly of the brake for the castor in the invention.

To put the brake body 50 on the castor body 50, the upper brake button 32 is pressed down, and the sloped surfaces 320 of the upper brake button 32 pushes the sloped surfaces 311 of the lower brake button 31 so the lower brake button 31 will move down and rotate and then the projecting ridges 310 move from the vertical grooves 221 to hook with the projecting ridges 220 of the cylindrical hole 22. Then the lower brake button 31 also presses down the rear portion of the brake plate 30, which then presses down on the surface of the castor body 50 to keep it immovable, with the front portion with the disc gear 300 seesawed up with the projections 301 functioning as pivots and engaging with the direction gear 4, which is then immovable so as to prevent the castor body 50 from changing its direction. Then the annular colored line 322 of the upper brake button 32 is sunk down with the upper brake button 32, invisible to indicate the brake is put on the castor body 50.

On the contrary, in order to take the brake off the castor body 50, the upper brake button 32 is further pressed a little to actuate the projecting ridges 310 of the lower brake button 31 to let the sloped surfaces 320 push and slide on the sloped surfaces 311 of the lower brake button 31 so as to rotate the lower brake button 31 and the projecting ridges 310 also rotate to disengage from the projecting ridges 220 of the cylindrical hole 22 and move to fit in the vertical grooves 221 of the cylindrical hole 22. Therefore, the lower brake button 31 and the upper brake button 32 are pushed up by the rear portion of the brake plate 30 seesawed by the front portion sinking down by the disappearance of the pushing force of the upper brake button 32. Then the disc gear 300 is in a separating condition from the direction gear 4 by elasticity of the coil spring 330, and the direction gear 4 becomes free to let the castor body 50 also free to change its direction.

Provided that the castor is not braked but is to be oriented in its direction, only press down the pedal 71 to push down the position plate 70. Then the hook member 700 of the position plate 70 moves up to engage the engage groove 42 of the direction gear 4 with the pivotal hole 701 functioning as a fulcrum, so the castor body 50 is secured in its direction, impossible to change it.

In case of removing the orienting of the castor 50 after oriented, only pressing down the release plate 72 can let the pedal 71 move up. Then the position plate 70 is moved up by elasticity of the spring 704, with the hooking member 700 descending to unhook from the engage groove 42 of the direction gear 4. So the castor body 50 is then free to roll.

The castor in the present invention has the following advantages, as can be understood from the aforesaid description.

1. The brake unit 3 is easily handled to put the brake on the castor body 50 by simply pressing the upper brake button 32, very convenient.
2. In case of operating the brake to stop the castor, it is also secured in its direction, with two objectives obtained at the same time.
3. The orienting system comprises the pedal 71 and the release plate 72 to easily carry out locking and unlocking its direction by pressing down process without bending user's body, very simple to handle.
4. The braking system and the orienting system produce vary little noise in operation, suitable to hospitals or clinics demanding quietness.
5. The braking system and the orienting system are integrated for easy handling.

While the preferred embodiment of the invention has been described above, it will be recognized and understood that various modifications may be made therein and the appended claims are intended to cover all such modifications that may fall within the spirit and scope of the invention.

What is claimed is:

1. A castor comprising:
   a castor supporting member having a cylindrical hole formed in an upper rear portion, a shaft hole formed in an upper front portion, a pivot base portion formed under said shaft hole and having two vertical parallel walls defining an interior hollow, said pivot base portion having an insert recess respectively formed in an inner surface of said two vertical parallel walls, said cylindrical hole having a plurality of vertical projecting-inward ridges formed spaced apart equidistantly on an inner wall and a plurality of vertical grooves also spaced apart equidistantly in the inner wall and alternately interposed with said vertical projecting-inward ridges;
   a brake system positioned in a lower portion of the hollow interior of said castor supporting member, said brake system consisting of a brake plate, an upper brake button and a lower brake button, said brake plate having a disc gear formed in a front portion, a sidewise projections formed at two sides of an intermediate portion, a projection with a center hole formed in a rear end, a steel ball fitted in the center hole, said lower brake button having a plurality of vertical ridges spaced apart on an outer circumferential surface and a plurality of sloped surfaces formed on an annular surface of a lower portion of said lower brake button, said upper brake button fitting on an upper half portion of said lower brake button and having plural sloped surfaces to match with those of said lower brake button;
   an orienting system provided in a lower portion of the hollow interior of said castor supporting member, consisting of a position plate, a pedal and a release plate, said position plate having a hooking member in a front end, a pivotal hole in an intermediate portion and a pivotal hole in a rear end, said pedal and said release plate positioned by pivots fitting in said pivotal holes;
   a direction gear positioned a little above said gear of said brake plate, having a center hole for a threaded rod to pass through from under and fixed with the threaded rod;
   a castor unit combined with said castor supporting member, having a castor body, a sealing member, a protective cap and an axle extending through the center hole of said sealing member, said protective cap and said castor body combined with the two pivotal holes of said pivot base portion of said castor supporting member;
   a threaded rod unit having a threaded rod, an oil seal, a connect head and a female-threaded tube positioned orderly on said shaft hole of said castor supporting member, said threaded rod passing through the center hole of said gear of said brake plate, the center hole of said direction gear, said shaft hole of said castor supporting member, said oil seal, said connect head and then screwing with female threads of said threaded tube; and,
   said upper brake button pressed down for a certain distance for putting the brake on said castor body and pressed down further for a little distance to take the brake off said castor body, said pedal pressed down to secure the rolling direction of said castor, and said release plate pressed down to remove the locked direction of said castor.

2. The castor as claimed in claim 1, wherein said upper brake button further has an annular colored line formed on an intermediate section, and the annular colored line may be hidden in said cylindrical hole, not visible from outside, when said upper brake button is pressed down for putting brake on said castor body.

3. A castor comprising:
   a castor supporting member having a cylindrical hole formed on an upper rear portion, a shaft hole formed in an upper front portion, a pivot base portion formed under said shaft hole and having two vertical parallel walls defining a interior hollow, said pivot base portion having an insert recess respectively formed in an inner surface of said two vertical parallel walls, said cylindrical hole having a plurality of vertical projecting-inward ridges formed spaced apart equidistantly on an inner wall and a plurality of vertical grooves also spaced apart equidistantly in the inner wall and alternately interposed with said vertical projecting-inward ridges;
   an orienting system provided in a lower portion of the hollow interior of said castor supporting member, consisting of a position plate, a pedal and a release plate, said position plate having a hooking member in a front end, a pivotal hole in an intermediate portion and a pivotal hole in a rear end, said pedal and said release plate positioned by pivots fitting in said pivotal holes;
   a direction gear positioned a little above said gear of said brake plate, having a center hole for a threaded rod to pass through from under and fixed with the threaded rod;
   a castor unit combined with said castor supporting member, having a castor body, a sealing member, a protective cap and an axle extending through the center hole of said sealing member, said protective cap and said castor body combined with the two pivotal holes of said pivot base portion of said castor supporting member;
   a threaded rod unit having a threaded rod, an oil seal, a connect head and a female-threaded tube positioned orderly on said shaft hole of said castor supporting member, said threaded rod passing through the center hole of said gear of said brake plate, the center hole of said direction gear, said shaft hole of said castor supporting member, said oil seal, said connect head and then screwing with female threads of said threaded tube; and, said pedal pressed down to secure the rolling direction of said castor, and said release plate pressed down to remove the locked direction of said castor.

4. A castor comprising:

a castor supporting member having a cylindrical hole formed on an upper rear portion, a shaft hole formed in an upper front portion, a pivot base portion formed under said shaft hole and having two vertical parallel walls defining a interior hollow, said pivot base portion having an insert recess respectively formed in an inner surface of said two vertical parallel walls, said cylindrical hole having a plurality of vertical projecting-inward ridges formed spaced apart equidistantly on an inner wall and a plurality of vertical grooves also spaced apart equidistantly in the inner wall and alternately interposed with said vertical projecting-inward ridges;

a brake system positioned in a lower portion of the hollow interior of said castor supporting member, said brake system consisting of a brake plate, an upper brake button and a lower brake button, said brake plate having a disc gear formed in a front portion, a sidewise projections formed at two sides of an intermediate portion, a projection with a center hole formed in a rear end, a steel ball fitted in the center hole, said lower brake button having a plurality of vertical ridges spaced apart on an outer circumferential surface and a plurality of sloped surfaces formed on an annular surface of a lower portion of said lower brake button, said upper brake button fitting on an upper half portion of said lower brake button and having plural sloped surfaces to match with those of said lower brake button;

a direction gear positioned a little above said gear of said brake plate, having a center hole for a threaded rod to pass through from under and fixed with the threaded rod;

a castor unit combined with said castor supporting member, having a castor body, a sealing member, a protective cap and an axle extending through the center hole of said sealing member, said protective cap and said castor body combined with the two pivotal holes of said pivot base portion of said castor supporting member;

a threaded rod unit having a threaded rod, an oil seal, a connect head and a female-threaded tube positioned orderly on said shaft hole of said castor supporting member, said threaded rod passing through the center hole of said gear of said brake plate, the center hole of said direction gear, said shaft hole of said castor supporting member, said oil seal, said connect head and then screwing with female threads of said threaded tube; and, said upper brake button pressed for a certain distance to put the brake on said castor body and further pressed a little more distance to take the brake off said castor body with easiness.

5. The castor as claimed in claim 4, wherein said the engage blocks and the engage grooves of said brake system, said orienting system and said direction gear are interchangeable in their positions.

* * * * *